United States Patent
Burke, III et al.

(10) Patent No.: US 6,787,215 B1
(45) Date of Patent: *Sep. 7, 2004

(54) CLEAT-FORMING WOVEN FABRIC ARTICLE FOR THE MANUFACTURE OF ANTI-CREEP FLOOR MATS

(75) Inventors: William O. Burke, III, LaGrange, GA (US); Robert C. Kerr, LaGrange, GA (US); Aage Lang, Kolind (DK)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/574,856
(22) Filed: May 19, 2000

Related U.S. Application Data

(63) Continuation-in-part of application No. 09/405,883, filed on Sep. 24, 1999, now Pat. No. 6,303,068.

(51) Int. Cl.$^7$ .............................. B32B 3/30; B32B 5/18
(52) U.S. Cl. ....................... 428/159; 428/156; 428/141; 428/160; 428/158; 428/318.8; 428/85; 428/95; 15/215; 15/217; 4/580; 4/581; 4/582; 4/583
(58) Field of Search ................................. 428/156, 141, 428/160, 158, 159, 318.8, 85, 95; 15/215, 217; 4/580, 581, 582, 583

(56) References Cited

U.S. PATENT DOCUMENTS 1,805,038 A * 11/1927 Derr ........................... 428/156

(List continued on next page.)

FOREIGN PATENT DOCUMENTS

| EP | 0 351 041 | | 5/1989 | |
|---|---|---|---|---|
| EP | 0 512 904 | | 4/1992 | |
| JP | 08215131 A | * | 8/1996 | ........... A47L/23/22 |
| WO | 9904942 | | 2/1999 | ............ B26D/1/03 |
| WO | 01/21875 | | 9/2000 | |

Primary Examiner—William P. Watkins, III
(74) Attorney, Agent, or Firm—Terry T. Moyer; Charlotte C. Wilson

(57) ABSTRACT

The present invention relates to specific methods of producing cleated rubber-backed floor mats (such as dust control or rubber mats) through the utilization of the combination of a perforated coated woven fabric article and a cushioned platen liner between the article and the metal platen of an in-line dust control mat manufacturing machine. Such a procedure permits a more efficient manner of producing cleated anti-creep dust control mats than previously followed. In particular, the fabric article is in the form of a conveyor belt and is preferably constructed from Teflon®-coated woven fiberglass which will not adhere to the tacky rubber component of the target mat and can withstand the extremely high vulcanization temperatures and pressures required during the production of a dust control mat. The cushioned platen liner, which is preferably comprised of or coated with silicon, is utilized as a separator between the metal platen of the manufacturing machine, as well as cushion for the molten rubber as it is pressed through the conveyor belt perforations during vulcanization. Such a cushioned liner material substantially eliminates any problems due to the force of the metal platen against the molten rubber as it passes through the article perforations. Further, a method for utilizing the conveyor belt to produce foam rubber cleated anti-creep mats is disclosed. The cleats of these mats have a thicker skin than the rest of the mat, thereby imparting enough strength and structural integrity so that the foam rubber mats may withstand the daily rigors of use, combined with periodic launderings. The produced mat as well as the woven fabric article/cushioned platen liner combination are also encompassed within this invention.

7 Claims, 1 Drawing Sheet

U.S. PATENT DOCUMENTS

| | | | |
|---|---|---|---|
| 3,833,440 A | | 9/1974 | Kashiwa et al. ............. 156/244 |
| 4,329,981 A | * | 5/1982 | Dungl ........................ 601/28 |
| 4,332,847 A | | 6/1982 | Rowland ..................... 428/156 |
| 4,463,861 A | * | 8/1984 | Tsubone et al. ............ 215/12.2 |
| 4,731,275 A | | 3/1988 | Andersen .................... 428/95 |
| 4,741,065 A | | 5/1988 | Parkins ........................ 15/217 |
| 4,902,554 A | | 2/1990 | Lang ........................... 428/195 |
| 5,170,526 A | | 12/1992 | Murray ........................ 15/215 |
| 5,227,214 A | | 7/1993 | Kerr et al. .................... 428/95 |
| 5,304,272 A | | 4/1994 | Rohrbacker et al. ......... 156/209 |
| 5,902,662 A | | 5/1999 | Kerr ............................ 428/95 |
| 6,014,779 A | * | 1/2000 | Lindholm ...................... 4/583 |
| 6,296,919 B1 | * | 10/2001 | Rockwell et al. ............. 15/215 |
| 6,303,068 B1 | * | 10/2001 | Kerr et al. ................... 264/293 |
| 6,340,514 B1 | * | 1/2002 | Kerr et al. ............. 156/244.27 |
| 2001/0046582 A1 | * | 11/2001 | Kerr et al. .................... 428/95 |
| 2002/0178661 A1 | * | 12/2002 | Burke et al. ................. 52/177 |
| 2003/0091782 A1 | * | 5/2003 | Burke, III et al. ............ 428/81 |

* cited by examiner

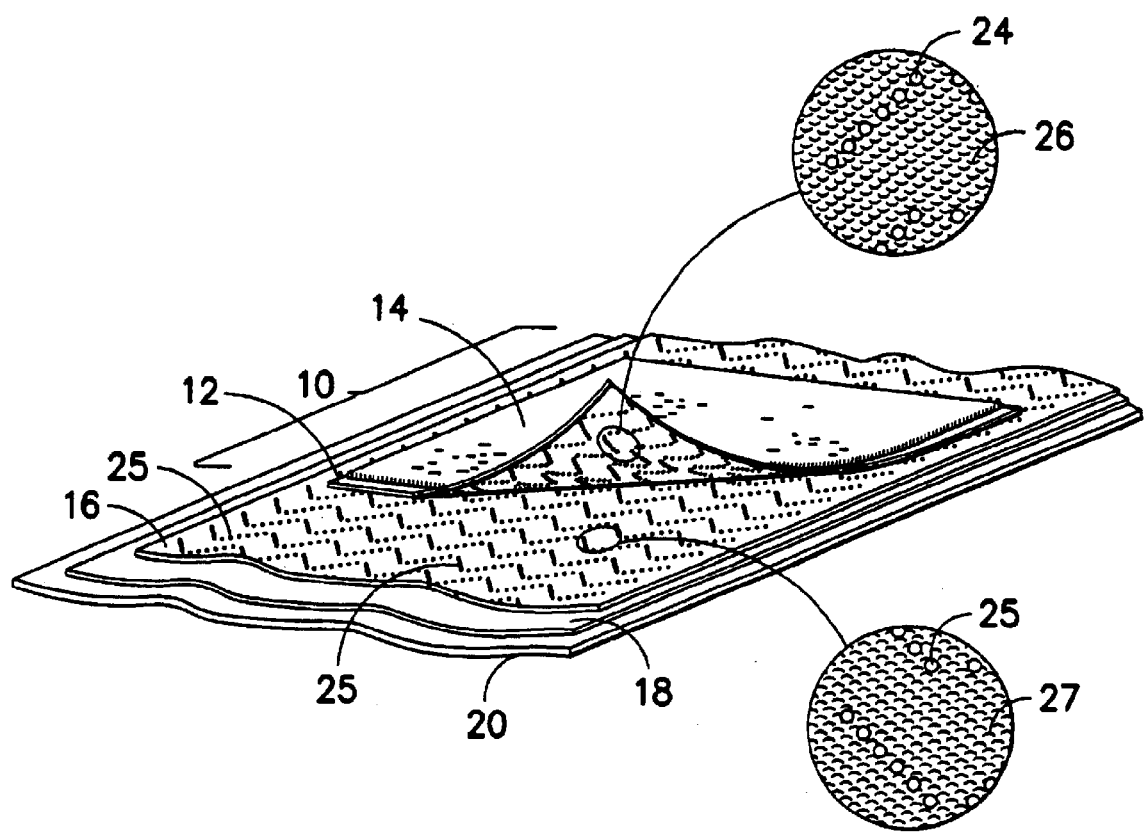
FIG. —1—

CLEAT-FORMING WOVEN FABRIC ARTICLE FOR THE MANUFACTURE OF ANTI-CREEP FLOOR MATS

RELATED APPLICATIONS

This is a continuation-in-part of prior U.S. application Ser. No. 09/405, 883, filed Sep. 24, 1999 now U.S. Pat. No. 6,303,068.

FIELD OF THE INVENTION

The present invention relates to specific methods of producing cleated rubber-backed floor mats (such as dust control or rubber mats) through the utilization of the combination of a perforated coated woven fabric article and a cushioned platen liner between the article and the metal platen of an in-line dust control mat manufacturing machine. Such a procedure permits a more efficient manner of producing cleated anti-creep dust control mats than previously followed. In particular, the fabric article is in the form of a conveyor belt and is preferably constructed from Teflon®-coated woven fiberglass which will not adhere to the tacky rubber component of the target mat and can withstand the extremely high vulcanization temperatures and pressures required during the production of a dust control mat. The cushioned platen liner, which is preferably comprised of or coated with silicon, is utilized as a separator between the metal platen of the manufacturing machine, as well as cushion for the molten rubber as it is pressed through the conveyor belt perforations during vulcanization. Such a cushioned liner material substantially eliminates any problems due to the force of the metal platen against the molten rubber as it passes through the article perforations. Further, a method for utilizing the conveyor belt to produce foam rubber cleated anti-creep mats is disclosed. The cleats of these mats have a thicker skin than the rest of the mat, thereby imparting enough strength and structural integrity so that the foam rubber mats may withstand the daily rigors of use, combined with periodic launderings. The foam rubber mats described herein are also encompassed within this invention.

BACKGROUND OF THE PRIOR ART

All U.S. patent cited herein are hereby fully incorporated by reference.

Floor mats have long been utilized to facilitate the cleaning of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoors. As will be appreciated, such outdoor mats by their nature must undergo frequent repeated washings and dryings so as to remove the dirt and debris deposited thereon during use. These mats are generally rented from service entities which retrieve the soiled mats from the user and provide clean replacement mats on a frequent basis. The soiled mats are thereafter cleaned and dried in an industrial laundering process (such as within rotary washing and drying machines, for example) and then sent to another user in replacement of newly soiled mats. Furthermore, it is generally necessary from a health standpoint to produce floor coverings on which persons may stand for appreciable amounts of time which will provide comfort to such persons to substantially lower the potential for fatigue of such persons by reducing the stress on feet and leg joints through cushioning.

Typical carpeted dust control mats comprise solid and/or foam rubber backing sheets which must be cleated in some manner to prevent slippage of the mat from its designated area. Such cleats are formed during a vulcanization step and have required a time-consuming procedure of placing the green (unvulcanized) rubber sheet on a molded, perforated silicone pad which is itself placed by hand on the conveyor belt of a dust control manufacturing apparatus. The finished mat is then removed after vulcanization from the non-stick silicon pad. The resultant mat product possesses cleats formed through the melting and forcing of part of the rubber backing through the pad perforations during vulcanization. Such cleats provide anti-slip or anti-creep characteristics to the finished mat when placed upon a surface to be protected. Various types, shapes, and arrangements of cleats have been utilized in the past for such anti-creep benefits with dust control mats. Examples include U.S. Pat. No. 4,741,065 to Parkins, U.S. Pat. No. 5,170,526 to Murray, and U.S. Pat. No. 5,227,214 to Kerr et al.

Heretofore, attempts to use a foam rubber backing on cleated floor mats or carpets have been mostly unsuccessful because the foam rubber is rather weak, with poor abrasion resistance, which leads to the cleats being quickly worn away. The foam rubber is too soft to withstand the daily rigors of wear and tear in combination with the periodic laundering process. However, it would be desirable to provide a rubber floor mat or carpet having a foam rubber, cleated backing because of the reduced, weight and improved frictional characteristics imparted by the foam rubber.

As noted above, previous methods of providing such cleat features to rubber-backed mats are generally produced through the utilization of a perforated silicon pad which is placed by hand on a conveyor belt on in in-line vulcanization apparatus. A rubber article is then placed on top of silicon pad, and optionally a fabric pile (such as a carpet) is then placed, again by hand, on top the rubber article. The conveyor belt then transports the entire composite to a vulcanization chamber wherein it is pressed at a pressure of from about 25 to about 50 psi at a temperature of from about 300 to about 400° F. for anywhere between about 30 seconds and 20 minutes. After vulcanization, the conveyor belt transports the finished composite (floor mat plus silicon pad) out of the chamber. The floor mat is then removed from the pad and allowed to cool and the pad is moved, by hand, back to a location on the conveyor belt, prior to the chamber, in order for another rubber article to be placed thereon. Such a procedure is labor-intensive and inefficient. However, until now, there have been no disclosures of proper methods to reduce the time and labor required to effectively and efficiently produce rubber-backed cleated floor mats. There have been developments in conveyor belts, particularly those covered with Teflon® coatings, for utilization in other rubber molding processes. However, there has been no discussion or suggestion regarding the problems associated with cleat-forming perforated conveyor belts in the past. In light of the above, it will be appreciated that there is a need for a process and apparatus to efficiently produce cleats within the rubber backing of an anti-creep floor mat. Further, there exists a need to produce a foam rubber, cleated mat or carpet that includes thick-skinned cleats, which are resistant to wear and tear during use, as well as during periodic laundering. The present invention thus represents a useful advancement over prior practice.

OBJECT OF THE INVENTION

In view of the foregoing, it is a general object of the present invention to provide an in-line method for the production of cleats in a rubber or rubber-backed floor mat. Furthermore, it is an object of this invention to provide a novel conveyor belt system for an in-line floor mat manufacturing apparatus. Additionally, an object of this invention is to provide a cleated anti-creep floor mat which is more easily and efficiently produced than standard cleated floor mats. Still another object of this invention is to provide an anti-creep floor mat which exhibits not only cleats to provide anti-slip characteristics, but also intermittent patterned areas within the rubber on the underside of the rubber floor mat component which mirrors the woven structure of the perforated fabric article. Another object of the present invention is to provide a foam rubber floor mat having a relatively thin skin of dense rubber on an outer layer thereof, and further having cleats that include a thick skin of dense rubber on at least the bottom portions of the cleats. Yet another object of the present invention is to provide a foam rubber floor mat as described above, which further includes a carpet pile secured to one side thereof.

Accordingly, this invention encompasses a method of producing a cleated anti-creep floor mat comprising a rubber mat component with a mat producing apparatus comprising the steps of:

(a) providing a perforated woven fabric article, which is coated or comprised of a material which will not adhere to said rubber mat component after a vulcanization step, wherein said perforated woven fabric article is optionally separated from the metal platen of said apparatus by a cushioned platen liner;

(b) placing said rubber mat component on top of said perforated woven fabric article of step "a" and optionally placing thereon a fabric pile;

(c) transporting the rubber mat component/perforated woven fabric article composite to a vulcanization chamber; and (d) vulcanizing said rubber mat component as it remains on top of the perforated woven fabric article, thereby forming cleats through the perforations of said perforated woven fabric article;

wherein said woven fabric article and said optional platen liner are comprised of or coated with materials which can withstand the temperatures and pressures associated with vulcanization. Also, this invention concerns a floor mat manufacturing apparatus having a metal platen wherein said apparatus further comprises a perforated conveyor belt positioned on top of a cushioned platen liner which is positioned on top of said metal platen. Additionally, this invention encompasses floor mat article comprising at least a rubber sheet component wherein said rubber comprises a plurality of cleats formed integrally on the surface and at least a portion of the surface of said rubber sheet also comprises a weave pattern of molded rubber.

Also, a method for-making a foam rubber cleated floor mat or carpet is described, including the steps of:

providing a mold having at least one recess to form at least one protrusion on said floor covering article;

providing a temperature differential between a bottom portion of the recess and other portions of the mold, so that the bottom portion of the recess maintains a higher temperature than other portions of the mold;

placing an unvulcanized foam rubber compound onto the mold; and vulcanizing the floor covering article.

The term "perforated" or "perforations" is intended to encompass any configuration of holes within the woven fabric article structure through which molten rubber may be forced during vulcanization. Thus, any shape hole, any orientation of holes, and any depth of such holes is encompassed within such a term. Preferably, the holes (perforations) are circular in shape ultimately to produce cylindrically shaped cleats in the target mat article. Also, the diameter of such perforations are preferably from about 1/64 inch to about 1/4 inch; more preferably from about 1/32 inch to about 1/8 inch; and most preferably from about 3/32 to about 1/16 inch.

Preferably, the perforated woven fabric article of the instant invention exhibits a modulus of from about 70 to 100 on the Shore A Hardness Scale and is present in the form of a conveyor belt which thereby permits an in-line mat production procedure. In such a form, the platen liner must be utilized under the conveyor belt in order to reduce off-quality cleat production, as discussed below. However, if desired, the woven fabric article may also be a separate article that is cut from a web of fabric which can be placed by hand on a cushioned platen liner and/or on a standard conveyor belt within a mat a manufacturing apparatus. After vulcanization, the finished mat can easily be removed from the fabric article and the fabric article can then be transported to a pre-vulcanization location for placement of another rubber mat component thereon. The preferred conveyor belt of the instant invention must be constructed of material which not only can withstand continuous and/or repeated movement around a rotating drum and through a standard in-line floor mat manufacturing apparatus; such materials (including the cut-out forms of such woven fabric articles) must also be able to withstand the high temperatures and pressures associated with rubber vulcanization. The core material of such a belt or cut-out is thus preferably fiberglass although other materials, such as polyaramids, silicon, and the like, may also be utilized. The belt or cut-out should also be coated with a covering which can also withstand vulcanization temperatures and pressures and not appreciably adhere to molten rubber. Silicon may be utilized for this purpose as well; however, the preferred coating is polyfluoroethylene, also known as Teflon®, available from DuPont. The preferred conveyor belt (or cut-out fabric) is first produced by taking a woven (or non-woven) fiberglass fabric and coating it with a certain number of Teflon® layers. Perforations are then cut into the coated fabric to conform with the desired shape and orientation of ultimately formed cleats on the target floor mat article. Then, the cut fabric is coated with a few more layers of Teflon® in order to insure the potentially frayed fibers of the cut fiberglass will not interfere with the eventual removal of the target floor mat article from the belt surface. If such frayed fiber ends were not coated themselves, they could adhere to the mat and produce aesthetically displeasing results. The coated fabric, and thus the belt itself, may have a thickness of from about 1/64 inch to about 1/4 inch, depending on the desired size of the ultimately formed cleats. The thickness of the fabric (belt) dictates the length of the projected cleats from the rubber surface of the mat article since, upon melting during vulcanization, the rubber will become forced through the perforations of the belt a distance roughly the same as the belt thickness. Preferably, the cleat lengths are from about 1/64 to 1/4 inch, more preferably from about 1/32 inch to about 1/8 inch; most preferably about 3/32 inch.

Prior to incorporating the aforementioned preferred conveyor belt to a floor mat manufacturing apparatus (which generally comprises a metal platen over which the conveyor belt would be placed directly), a cushioned platen liner is placed over the metal platen. A platen liner may be placed beneath the cut-out woven fabric article as well; however, since the hand-placed fabric article would most likely be placed on a conveyor belt itself, or placed within a shelf-type vulcanization chamber, some degree of cushioning would already be provided which could render the utilization of such a platen liner unnecessary.

In general, it has been discovered that the platen liner should be present to avoid the creation of "flared" cleats in the final mat product. Such a problem is caused by both the lack of adhesion between the molten rubber and the Teflon®-coated fabric surface as well as the force of the metal platen on the molten rubber forced through the fabric perforations. Without a cushioning platen liner, when the vulcanization chamber presses down on the mat article, the rubber, upon melting, is forced through the perforations into the metal platen. The force of the stationary metal platen then forces the rubber back toward the belt and rubber article; however, the molten rubber will seek the path of least resistance rather than returning through the perforation it came originally. Without the adhesion between the fabric and the rubber, the rubber will easily move between the fabric and the platen. In such an instance, upon exiting the vulcanization chamber, the mat article is not easily removed from the belt (since the rubber forms "hooks" on the underside of the belt). The resultant mat article thus exhibits aesthetically displeasing cleat formations which themselves possess suspect effectiveness as preventing slippage or creeping of the mat when placed on a protected surface. Hence, it was discovered that in order to provide such an efficient procedure of in-line cleat forming for floor mat articles, a cushioned platen liner was required to separate the fabric article (belt) from the metal platen and to provide cushioning of the rubber to prevent re-forcing back toward the belt itself during vulcanization. However, such a platen liner may not be required when a cut-out article is utilized to produce the desired cleats, most notably when the conveyor belt itself (which may be coated rubber, or other fabric, for example) within the mat manufacturing apparatus provides the necessary cushioning effect; but, other times there will be a need to utilize such a cushioned article to reduce the production of off-quality cleats.

When present, the platen liner preferably covers the entire area of the metal platen over which mat articles will be placed. Preferably, the platen liner will possess a modulus of from about 40 to 70 on the Shore A Hardness Scale in order to provide the necessary cushioning effects for proper cleat formation. Preferably, the modulus is about 50 on the same scale. Furthermore, the platen liner must be able to withstand the high temperatures and pressures associated with rubber vulcanization. Thus, the liner must be constructed from material that possesses both characteristics. The preferred material is a rubber coated silicon (available from Taconic, for example), which exhibits a Shore Hardness of about 50. However, the liner may also be constructed from other heat-resistant materials which have been incorporated within flexible fabrics, rubber, and the like, and/or alternatively coated with a heat-resistant material, such as Teflon®, silicon, and the like. The thickness of such a liner is not of great importance, although, the thicker the better (for cushioning purposes). The utilization of too thick a liner will not seriously impact the effectiveness of the perforated conveyor belt in producing the desired cleats; however, as silicon liners are rather expensive, the thickness should be dictated primarily by cost versus available cushioning characteristics. As such, a thickness of from about 1/64 inch to about 1/2 inch is preferred; 1/64 to about 1/8 inch more preferred; and 1/64 inch to about 1/32 inch most preferred.

In an alternate embodiment, foam rubber is used to form a cleated floor mat or carpet that is strong enough to withstand the normal, day to day wear and tear, as well as the periodic launderings and washings that are commonly performed on these articles. The method and apparatus for mat manufacture disclosed herein may be used to advantageously produce a foam rubber cleated floor mat or carpet in accordance with the present invention.

BRIEF DESCRIPTION OF THE DRAWING

FIG. 1 is a perspective view of the composite of platen, platen liner, conveyor belt, and floor mat constructed to produce the inventive floor mat.

While the invention will be described in connection with preferred embodiments and procedures, it is to be understood that the invention is in no way intended to be limited by such description. On the contrary, it is intended to cover all alternatives, modifications and equivalents as may be included within the true spirit and scope of the invention as defined by the claims appended

DETAILED DESCRIPTION OF THE DRAWING

Turning now to the drawing wherein like reference numerals designate like components in the various views, in FIG. 1 there is shown in profile the composite of different utilized components for production of the inventive floor mat article 10. In the illustrated and preferred practice, a rubber mat backing sheet 12 is covered with, at least partially, and attached to (during vulcanization) a pile fabric 14 to form the desired floor mat 10. Cleats 24 are formed in certain locations on the underside of the rubber mat backing sheet 12 through placement of the sheet 12 (with or without the pile fabric 14 on top, preferably with) over a woven fabric article, in this instance a conveyor belt 16, which is formed from woven fiberglass and coated with Teflon® and which comprises cut-out holes 25 in certain locations on the belt 16 which correspond to the desired pattern of cleats 24 to be formed on the backing sheet 12. In a preferred embodiment, the woven structure 27 of the conveyor belt 16 also transfers such a woven pattern 26 to the backing sheet 12 to provide increased slip resistance supplemental to the cleats 24. In order to permit proper cleat formation on the backing sheet 12, a cushioned platen liner 18 made from silicon rubber is present underneath the conveyor belt 16. All of these layers of articles are placed upon the metal platen 20 of a mat manufacturing apparatus (not illustrated). The floor mat 10 has already been transferred by the belt 16 through a vulcanization chamber (not illustrated). Upon removal from the belt 16, the floor mat possesses the desired cleats 24 and woven patterns 26 for anti-creep benefits upon use.

It is to be understood, however, that the conveyor belt may be made from a nonwoven material, or any other suitable material that can withstand the rigors of the vulcanization chamber and that will not significantly bond with the rubber mats during the process. In one alternate embodiment, Teflon, nylon 6 and nylon 6,6 may be extruded in continuous sheet to form at thickness in the range of 1/64 to 1/2 inch in widths up to 80 inches wide. Conventional rotary screw extruders with appropriate sheet extrusion dies may be used to produce the extruded continuous sheet. These sheets can be perforated with the required hole configuration to produce a perforated belt to be used for molding mats. It should be noted that the ranges and materials used in this embodiment are the preferred ranges and materials for this specific embodiment, and that other suitable ranges and materials may be utilized.

In another novel aspect of the present invention, a foam rubber sheet 12 is placed onto the conveyor belt 16 and passed through a vulcanization chamber (not shown), where the foam rubber sheet 12 is heated and conforms on a lower side to the shape of the conveyor belt surface. A carpet pile 14 is optionally disposed on top of the foam rubber sheet 12. The perforations 25 in the belt 16 cause cleats 24 to form on the lower surface of the foam rubber sheet 12. The conveyor belt 16 passes over a heated metal platen 20, optionally including a stationary liner 18, and the conveyor belt 16 serves as a slight temperature buffer between the heated platen 20 (or liner 18) and the rubber sheet 12. The perforations 25 in the conveyor belt 16 cause the rubber 12 to come into direct contact with the heated platen 20 or liner 18, where the temperature is at least 5–10° C. hotter than the temperature of the upper surface of the conveyor belt 16. This increase in temperature causes the rubber to cross-link before completion of the foaming process, as described below, resulting in a thick dense rubber skin on the bottom of the cleat 24.

Rubber vulcanization is a chemical process that is catalyzed by heat. Generally, a 10° C. temperature increase doubles the rate of the vulcanization process. Foam rubber vulcanization is slightly different, because it is a balance of processes. The foaming of the rubber is performed by adding agents to the compound which cause bubbles to form (blow) when subjected to heat. Agents called curatives, which cross link the polymer molecules, and may be controlled by heat, accomplish the vulcanizing of the rubber. For most applications, the foam rubber vulcanization process ideally includes fully blowing the foam rubber before the cross-linking takes place. It is important to control the properties of the finished foam rubber, because if the cross-linking concludes before the blowing step is complete, the foam will not be fully formed, and possible stresses may be built into the structure. Further, if the heat is applied from only one side, it is difficult to produce a foam rubber of uniform structure, feel, and strength throughout.

In the present application, however, this effect is used advantageously to impart strength characteristics to the cleats of the mat. By applying the increased temperature to the bottom portions of the cleats (as set forth in the process above), that part of the rubber cures more quickly and the foaming step is not allowed to proceed to completion. This process results in a relatively thick dense rubber skin being formed on the bottom portions of the cleats. The vulcanization process typically forms a skin about the entire rubber sheet, having a thickness of about 10–15 microns. The cleats produced according to the present method typically have a skin thickness of about 40–80 microns, which provides a significant improvement regarding the strength of the cleats, and also regarding abrasion resistance of the mat. It should be understood that the thickness of the dense rubber surrounding the mat, as well as the thickness of the dense rubber on the bottom portions of the cleats, may be increased or decreased, depending on factors such as the temperature differential, the rubber compound, the type of mold or conveyor belt, and other manufacturing factors. The thickness of the skin on the bottom of the cleats should be on the order of 2 to 10 times the thickness of the skin encompassing the rest of the mat.

In a further step in the manufacturing process, the mats may be passed through a perforating process. A series of perforations are punched through the mat or floor covering. These perforations are small enough to be virtually unnoticeable, but are large enough to allow water to pass through during the centrifugal spin or pressure extraction process after laundering. This feature reduces the amount of energy that is required to dry the mats. U.S. Pat. No. 4,439,475 is directed to perforated mats and floor coverings, and is incorporated by reference herein in its entirety. In a preferred embodiment, the foam rubber is foamed to between about 1.5 and 2.5 times (an increase of 50% to 150%) its original volume, under high pressure, which tends to form a finer foam with smaller bubbles or air pockets therein. The terms "foamed" or "foaming" simply refer to the process of imparting small air bubbles to the foam rubber compound.

It is believed that this procedure reduces the tendency of perforated foam rubber to pucker, or swell, near the perforations when water is introduced to the mat for laundering and cleaning. If larger bubbles or air pockets are allowed to form within the foam rubber, the formation of perforations will puncture these large bubbles, which tend to fill up with water and cause the mat to pucker, resulting in the mat lying unevenly on a flat surface.

Nitrile foam rubber compounds are the preferred compounds for this application, but other suitable compounds may be used, including SBR, EPDM, Neoprene, Styrene Butadiene, Polychloroprene, and natural rubber. The pre-foamed layer of nitrile foam rubber compound is preferably 0.8 mm (or 32 mils) thick, and the foaming process results in an expansion rate of about 80%. Optionally, strips of solid rubber may be used as borders around the outer peripheral edges of the mat.

EXAMPLE

A solid rubber mat having the dense, solid rubber cleats was tested and compared to a foam rubber mat manufactured in accordance with the instant method. The units shown are millimeters of mat movement after a series of 100 two-step passes.

Surface Solid Rubber Mat with Cleats Foam Rubber Mat with Cleats

| Surface | Solid Rubber Mat with Cleats | Foam Rubber Mat with Cleats |
| --- | --- | --- |
| Concrete | 4 | 0 |
| Vinyl (Smooth) | 17 | 2 |
| Carpet Tile | 90 | 7 |
| Cut Pile Carpet | 336 | 216 |
| Boucle Carpet | 143 | 96 |

The test is performed by placing a test mat, which measures 85 centimeters ×150 centimeters, on the surface to be tested. The position of the mat is marked and the mat is walked over 100 times, in the same direction, with each pass placing both feet on the mat (two steps). As the test is performed on a comparative basis to a control sample (in the present case the solid rubber mat) the person or people walking on the mat can vary from test to test, however it was an adult of average weight (75–90 kilograms) wearing normal outdoor shoes. The movement is measured after the 100 passes. Thus, the above test provides results based on comparative testing.

It can be seen from the results of the above tests that the foam rubber mat with the thick skinned dense foam rubber cleats performed significantly better in the creep tests than the mat made from conventional solid rubber. This type of mat overcomes some of the traditional problems associated with cleated mats, particularly regarding the tendency of the cleated mats to move across flat, smooth surfaces (such as concrete, vinyl, wood, marble, etc.). While not wishing to be bound to a particular theory, it is believed that the suppleness of the cleat, combined with the ability of the soft foam rubber to compress around the cleat while under pressure, enables the mat to exhibit superior anti-creep characteristics.

While specific embodiments of the invention have been shown and described, it will be understood, of course, that the invention is not limited thereto, since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A rubber floor mat comprising:

a single vulcanized sheet of foam rubber having at least one protrusion integrated on, at least one side of said sheet;

said foam rubber sheet having a dense rubber skin completely encompassing said sheet, said dense rubber skin being formed from a single sheet of dense rubber; and wherein an outer portion of said protrusion has a thick dense rubber skin and wherein said protrusion has a diameter in the range of about $1/32$ inch to about $1/8$ inch and wherein said foam rubber if formed from a nitrile rubber compound and wherein the dense rubber skin formed on said outer portion of said protrusion is between twice and ten times as thick as said skin formed about said entire layer of said mat.

2. The rubber floor mat set forth in claim 1, further comprising at least one solid rubber reinforcing strip around outer peripheral edges of said rubber floor mat.

3. The rubber floor mat set forth in claim 1, further comprising a carpet pile secured to one side of said foam rubber sheet.

4. The rubber floor mat set forth in claim 1, wherein said protrusion has a diameter of about $3/32$ inch.

5. The rubber floor mat set forth in claim 1, wherein said sheet of foam rubber includes a plurality of protrusions integrated on one side of said sheet.

6. The rubber floor mat set forth in claim 1, wherein said sheet of foam rubber includes a plurality of protrusions integrated on both sides of said sheet.

7. The rubber floor mat set forth in claim 1, wherein said dense rubber skin on said protrusion is between about 30–80 microns thick.

* * * * *